Figure 1:
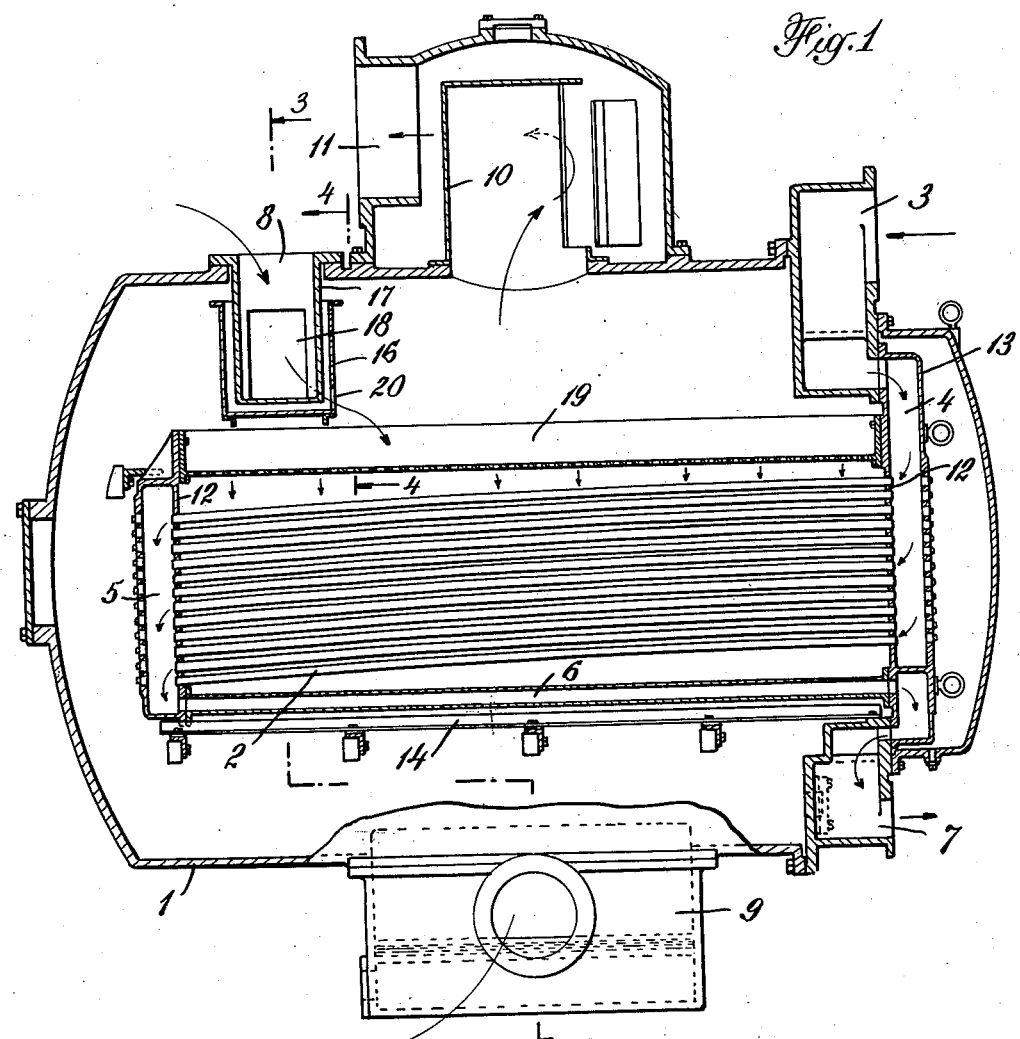

Feb. 8, 1927. 1,617,082
J. PRICE
FILM TYPE SECTIONAL EVAPORATOR
Filed March 3, 1925   3 Sheets-Sheet 1

INVENTOR
BY
ATTORNEY

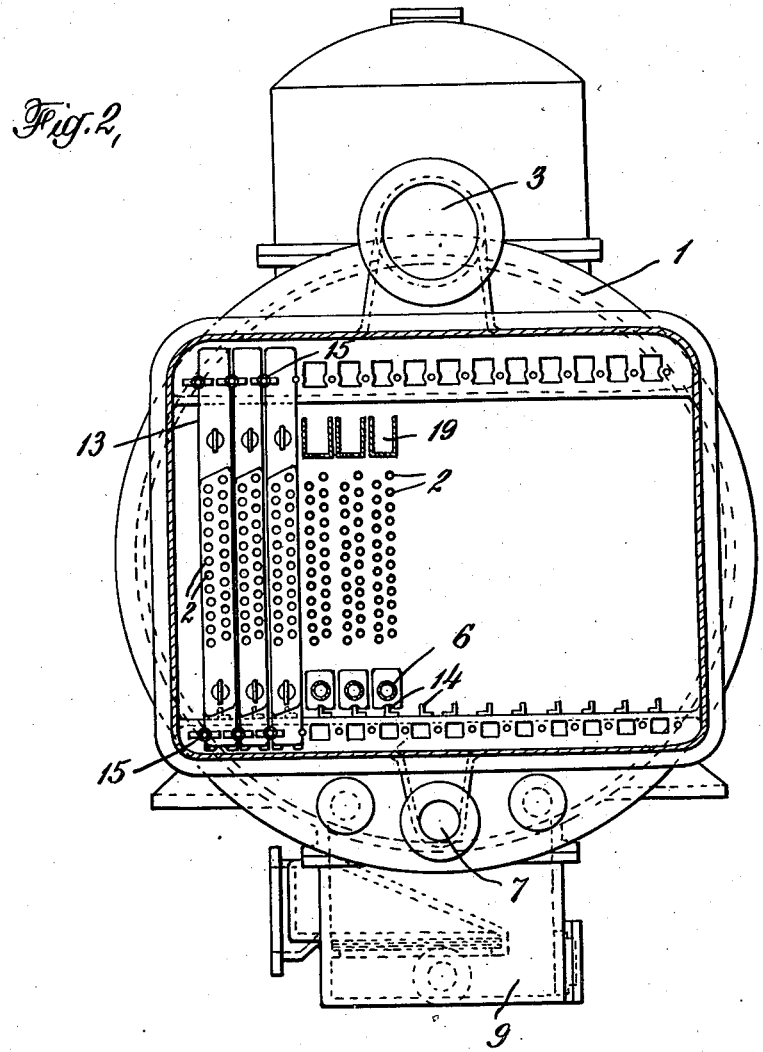

Feb. 8, 1927.  
J. PRICE  
1,617,082  
FILM TYPE SECTIONAL EVAPORATOR  
Filed March 3, 1925   3 Sheets-Sheet 3
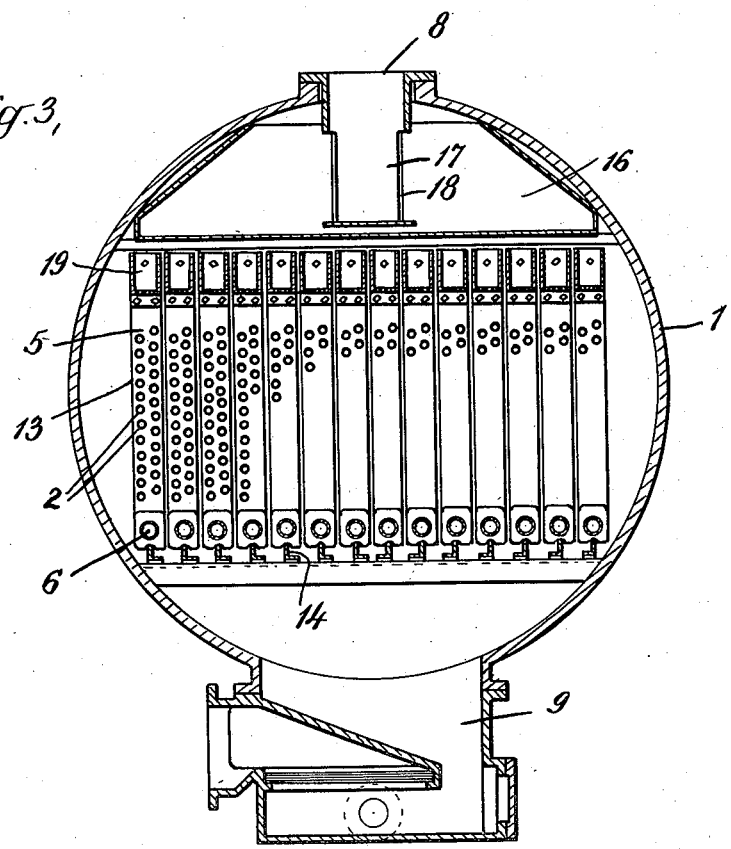
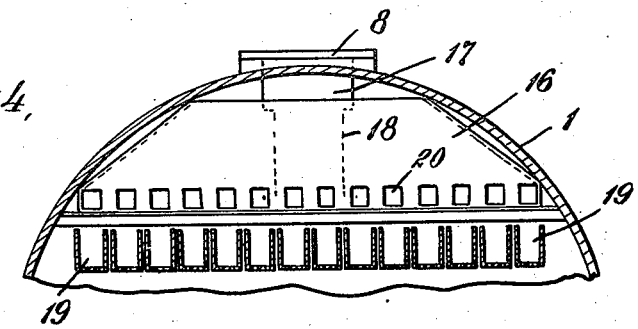
INVENTOR  
Joseph Price  
BY  
Pennie Davis Marvin & Edmonds  
ATTORNEY Patented Feb. 8, 1927.

1,617,082

UNITED STATES PATENT OFFICE.

JOSEPH PRICE, OF STAPLETON, NEW YORK, ASSIGNOR TO THE GRISCOM-RUSSELL COMPANY, OF NEW YORK, N. Y., A CORPORATION OF DELAWARE.

FILM-TYPE SECTIONAL EVAPORATOR.

Application filed March 3, 1925. Serial No. 12,906.

The present invention relates to an evaporator of the so-called film type for furnishing purified boiler feed water, and has to do particularly with the distribution of the liquid to be treated over the heat transferring surfaces of the evaporator.

In evaporators of the film type the impure liquid is distributed over the heating surface in the form of a film or layer and evaporation of the liquid is effected during the time that it is thus spread out upon the heating surface. This method of evaporation is in contrast to that which occurs in the ordinary type of evaporator wherein the heating tubes or coils are wholly or partially submerged in the body of liquid which is being evaporated. In the film type evaporator steam or other heating fluid is passed through the heat transferring tubes and the water is spread out as a film on the surface of the tubes. For the best operation the entire tube surface should at all times be covered with liquid so that the entire heat transferring surface will be effective in actively heating the liquid.

The heating element in film type evaporators commonly consists of a large number of tubes arranged in substantial parallelism and supported at their respective ends to constitute a unitary tube bundle. Heating elements of this nature consisting of a large number of closely grouped tubes are open to the objection that the tubes of the bundle are relatively inaccessible for purposes of inspection, cleaning or repair. Scale forming impurities precipitated from the liquid under treatment accumulate rapidly on the surfaces of the heat transferring tubes and soon impair the character of the heat transfer with the result that frequent removal of the scale is required. In my copending application, Serial No. 644,971, filed June 12, 1923, there is shown a film type evaporator of this general character employing in its heating element tubes which are slightly bowed for the purpose of cracking off accumulated scale. Upon changes in temperature these bowed tubes will flex and in this manner will serve to loosen and crack off the scaly deposit of impurities which has been precipitated from the liquid under treatment. In that application the heat transferring element is built in sections, each section being an independent unit which is readily removable from the shell to thereby afford easy access to every tube in the heat transferring element.

It is a principal object of the present invention to provide a film type evaporator of the class described having its heating element built in a plurality of independently removable sections and having in particular provision for the uniform distribution of the incoming liquor over the entire surface of all of the tubes of the heat transferring element, this distribution of the liquid being effected in such fashion as not to interfere with the independent removal of the individual tube sections. This system of liquid distribution is accomplished by providing for the admission of water into a principal distributing element which in turn discharges into a plurality of individual distributing elements, each of which is designed to distribute the liquid upon the surface of the tubes of one section of the heat transferring element. The individual distributing elements are constructed as an integral part of the respective sections of the tube bundle so that each of the independently removable sections consists of its quota of heat transferring tubes with their appropriate end supports and the distributing element pertaining to that section.

It is also an object of this invention to provide in an apparatus of the class referred to, inlet means capable of admitting to the principal distributing element in an orderly fashion and without splashing large quantities of the liquid to be treated. Similarly, provision is made for discharging liquid from the principal distributing element into the respective individual distributing elements in such fashion as to direct the liquid along the lengths of the individual elements to thereby insure the presence of liquid throughout the extent of each distributing element and at the same time avoid splashing and waste of liquid. This arrangement is of particular advantage for marine work in that a uniform distribution of the impure liquid over the heat transferring surfaces is effected even though the apparatus may be subject to the influence of the pitch and roll of the ship.

It is a still further object to provide a film type evaporator which is particularly adapted to the employment of the bowed tube construction for the purposes of scale removal. In the present structure each of the respective individual distributing elements serves as a spacing means between the end supports for the tubes of each section and thus serves to space these end supports a fixed distance apart so that flexure of the tubes is secured upon subjecting them to material temperature change, such as for instance, by successively passing steam and cold water through the tubes.

Figure 5:
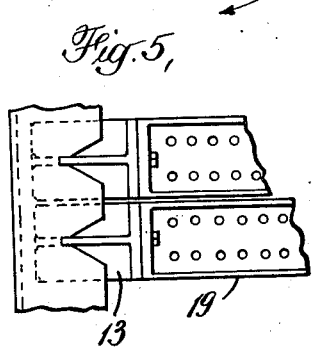
Figure 6:
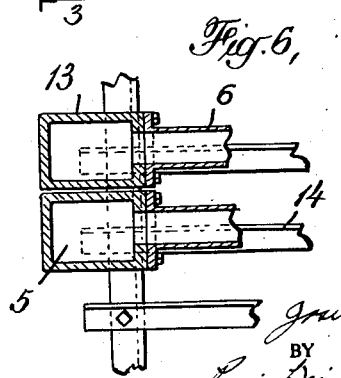

A preferred embodiment of the invention is illustrated in the accompanying drawings. In said drawings, Figure 1 is a vertical sectional view taken longitudinally through an evaporator embodying the invention, Figure 2 is an end view partly in section taken from the front of the apparatus of Figure 1, Figure 3 is a transverse sectional view taken on line 3—3 of Figure 1, Figure 4 is a partial sectional view taken on line 4—4 of Figure 1, and Figures 5 and 6 are detail views illustrating the mounting of the individual sections of the heating element.

Referring to the drawings, 1 indicates the shell of the evaporator wherein evaporation of the impure liquid take place. The heat transferring element consisting of a plurality of tubes supported at their respective ends and extending in substantial parallelism throughout the major portion of the length of the evaporator shell is indicated at 2. Heating steam is admitted through the inlet opening 3 from whence it passes into compartment 4 which is in communication with the initial end of the tubes 2. It then enters the tubes 2 and, after traversing their length, emerges into the chamber 5 at the other end of the heating element. The heating steam is practically entirely condensed during its passage along the heating tubes 2 and the condensate which is discharged into the chamber 5 enters the return or drain tube 6 by means of which it passes back along the length of the shell and is passed out of the apparatus through the discharge opening 7. The heating tubes 2 are supported at their respective ends in stationary tube sheets 12. Each of the tubes is slanted slightly along its length so that the discharge ends of the tubes are lower than their respective inlet ends. With this arrangement, satisfactory drainage of the condensate into the chamber 5 is insured. Each of the tubes is slightly bowed so that when subjected to an abrupt temperature change the resulting longitudinal expansion or contraction will alter the degree of bowing of the tube and will thus flex the heat transferring surfaces in such fashion as to crack off scale deposits which have accumulated on it, after the fashion disclosed in my above noted pending application.

The incoming impure liquid is admitted to the apparatus through the inlet opening 8 from whence it passes down upon the heating tubes 2. The liquid is spread out upon the tubes as a relatively thin film or layer and the heating medium within the tubes serves to effect vaporization of the liquid while thus distributed upon the tube surfaces. The excess of water which passes over the tube bundle without being evaporated accumulates in a collection chamber 9 provided at the bottom of the evaporator shell from whence it is commonly recirculated by pumping it into the apparatus again through the inlet opening 8. It is understood that suitable provision for discharging concentrated liquid from the system is made according to the usual evaporator practice so that a substantially constant liquid density may be maintained in the apparatus. The vapors generated at the heat transferring surfaces rise to the top of the apparatus and, after passing the separator baffle 10, are discharged through the outlet 11 following the course indicated by the arrows.

The present invention contemplates a heating element comprising a plurality of independently removable sections. Each of these sections consists of one or more vertical rows of the heating tubes 2 together with suitable end supports for the tubes. In the structure here shown (Figures 2 and 3) each of the independently removable sections is indicated at 13 and includes two vertical rows of heating tubes 2 extending throughout the height of the tube bundle. Any one of the individual sections 13 of the heating element may be withdrawn from the apparatus without disturbing any of the other elements by merely loosening the bolts 15 which secure that element in place and then sliding the element forward along its track 14 to thus bring it to the exterior of the shell for the purpose of inspection or repair. The details of the mounting by means of which the individual elements may be withdrawn from the apparatus are shown in Figures 5 and 6.

The impure liquid entering through the inlet opening 8 is directed into a master distributing tray or trough 16. The inlet 8 communicates directly with a cylindrical element 17 which extends down into the master distributing element 16 and is provided on opposite sides with slots or weir openings 18 for the purpose of discharging the incoming quantity of liquid into the element 16 in an orderly discharge stream directed along the length of the element. By providing these weir openings 18 it is possible to supply the master distributing element 16 with a large quantity of liquid and to distribute the liquid uniformly along the length of the element and accomplish this without splashing or overflowing of the liquid.

Each of the vertically disposed sections 13 of the heating element includes a perforated distributing tray 19 positioned at the top of the section and extending throughout the length of the heating tubes 2. The tray 19 is rigidly secured to the tube sheets 12 at the ends of the section and is therefore an integral part of the section and is removable with it. Each of the trays 19 receives a supply of the incoming liquid and serves to distribute that liquid as a spray over all of the tubes included in that section. By reason of the rigid connections between the tube sheets 12 and the distributing tray 19 the tray serves as a spacing element to maintain the tube sheets a fixed distance apart. This function is of particular value where the bowed tubes are employed for the reason that tube sheets must be held rigidly spaced while the tubes are subjected to temperature change in order that the desired scale cracking action will take place.

The master distributing tray 16 extends transversely of the heating element and serves as a means for distributing proper amounts of liquid to the respective individual distributing trays 19. The master tray 16 is provided with a series of orifices or weir openings 20. These openings correspond in number to the individual distributing trays 19 and are positioned respectively above the various trays 19 after the fashion shown in Figure 4. The liquid admitted to the master tray 16 is thus discharged in measured amounts through the various openings 20 into the respective trays 19. The orifices 20 serve to effect an orderly discharge of the liquid into the individual trays 19 and thus serve to distribute the liquid along the length of the tray so that the entire length of the heat transferring tubes will receive a supply of the incoming liquid.

The present invention contemplates essentially a liquid distribution means in a film type evaporator wherein a substantially uniform distribution of the impure liquid over the entire heat transferring surface is secured under all conditions of operation. The master distributing tray effects a proportionment of the liquid to the various sections of the heating element and the individual distributing trays distribute and spray upon the tubes of the respective sections that liquid which has been apportioned to each section. This apparatus is of particular advantage in marine work in that the effect of pitching and rolling of the ship on the distribution of the liquid is minimized.

I claim:

1. A heat exchanger of the class described, comprising a plurality of slightly bowed heat transferring tubes arranged in substantial parallelism, end supports for said tubes and a distributing element extending between said end supports for receiving liquid and distributing it upon said tubes, said distributing element being rigidly secured to said end supports to thereby serve as a rigid spacing element for maintaining said end supports a fixed distance apart.

2. A heat exchanger of the class described, having a heating element comprising a plurality of slightly bowed tubes, tube sheets for supporting the respective ends of said tubes, means at the bottoms of said tube sheets for effecting a rigid spacing thereof and a distributing tray at the top of the heating element for effecting distribution of liquid upon the heat transferring tubes and serving to space said tube sheets a fixed distance apart.

3. A heat exchanger of the class described, having a heating element comprising a plurality of independently removable sections, each of said sections having a plurality of slightly bowed tubes arranged in substantial parallelism, end supports for said tubes and a distributing element for effecting distribution of liquid upon the tubes of that section and serving also as a spacing member for maintaining said tube supports a fixed distance apart.

4. In a heat exchanger of the class described, a tube bundle comprising a plurality of independent sections, a tray positioned above each of said sections for supplying liquid thereto, a master tray for receiving incoming liquid and having a plurality of orifices for directing said liquid into said respective distributing trays along the length thereof and inlet means comprising a horizontally discharging orifice for passing the incoming liquid into said master tray lengthwise thereof.

5. A heat exchanger of the class described, comprising a heating element consisting of a plurality of independent sections, a master tray extending transversely of said heating element, inlet means for introducing liquid into the apparatus, a distributing member having a horizontally discharging orifice for directing liquid in an orderly fashion along the length of said master tray to avoid splashing of the liquid, and individual perforated distributing trays positioned above each of said sections for distributing liquid thereupon, said master tray having horizontally discharging orifices for directing liquid in orderly fashion into said receiving trays along the length thereof.

In testimony whereof I affix my signature.

JOSEPH PRICE.